(12) United States Patent
Arms

(10) Patent No.: US 6,588,282 B2
(45) Date of Patent: *Jul. 8, 2003

(54) PEAK STRAIN DETECTION LINEAR DISPLACEMENT SENSOR SYSTEM FOR SMART STRUCTURES

(75) Inventor: Steven W. Arms, Williston, VT (US)

(73) Assignee: Microstrain, Inc., Burlington, VT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 331 days.

(21) Appl. No.: 09/259,615

(22) Filed: Mar. 1, 1999

(65) Prior Publication Data

US 2001/0054317 A1 Dec. 27, 2001

Related U.S. Application Data

(60) Provisional application No. 60/076,750, filed on Mar. 4, 1998.

(51) Int. Cl.[7] .................................................. G01M 5/00
(52) U.S. Cl. ......................................................... 73/786
(58) Field of Search ........................... 73/786, 768, 784, 73/819, 851

(56) References Cited

U.S. PATENT DOCUMENTS

| 5,086,651 A | * | 2/1992 | Westermo et al. ............ 73/763 |
| 5,497,147 A | * | 3/1996 | Arms et al. ............ 340/870.35 |
| 5,507,188 A | * | 4/1996 | Svaty, Jr. ...................... 73/786 |
| 5,932,810 A | * | 8/1999 | Westermo et al. ............ 73/768 |

* cited by examiner

Primary Examiner—Benjamin R. Fuller
Assistant Examiner—Octavia Davis
(74) Attorney, Agent, or Firm—Thomas N. Neiman; James M. Leas

(57) ABSTRACT

The novel peak strain detection linear displacement sensor system for smart structures is designed to provide monitoring of the strain in structures and reporting their strain histories. The system comprises the use of micro miniature, high resolution, passive peak strain detector. A displacement sensor, such as a differential variable reluctance transducer, is used and the sliding core of the unit is constrained so that it shows the maximum movement in one direction. Once positioned and attached, mechanical movement of the core will always occur in response to structural deformation. The system comprises attachment devices and a body clamp and core extender and compressor, a housing, a spring loaded collar, a sensor core and a measuring unit.

30 Claims, 3 Drawing Sheets

PEAK STRAIN DETECTION LINEAR DISPLACEMENT SENSOR SYSTEM FOR SMART STRUCTURES

This is a utility application based upon the provisional application Ser. No. 60/076,750 filed on Mar. 4, 1998.

BACKGROUND OF THE INVENTION

This invention pertains to devices for measuring displacement, and, in particular, to an improved peak strain detection linear displacement sensor system for smart structures for use in situations that call for micro miniature, high resolution passive peak strain detector for determining damage or movement in structures such as buildings, bridges, aircraft frames, landing gear and composite structures.

There have been a number of attempts to develop highly accurate miniaturized sensors to be used by industry to measure displacement, elongation, and strain. Examples of these type of devices include U.S. Pat. No. 4,813,435 issued to Steven W. Arms on Mar. 21, 1989, based on Hall Effect sensors. An attempt to create a strain sensor capable of detecting peak strains is the U.S. Pat. No. 5,086,651 for a transformation induced plasticity (TRIP) steel device which shows units that have a simplicity of design and construction. However, TRIP units have limitations that include its large size, inherent nonlinearity, low resolution and irreversible response due to yielding.

Critical civilian and military structures require smart sensors in order to report their strain histories in order to insure safe operation after being subjected to exposure from potentially damaging load from hurricanes, earthquakes or military action or prolonged exposure to the elements.

It is the object of this invention to teach a micro miniature, high resolution, linear displacement sensor for peak strain detection in smart structures which avoids the disadvantages of and limitations of previous systems, and addresses the needs of linear position sensing in a critical structural situations. What is needed is a system which provides a high resolution, linear, peak displacement or strain measurement with very small sensors (approximately 1.5 mm diameter), without requiring power to hold its measurement, and, that is capable of being re-used.

SUMMARY OF THE INVENTION

It is the object of this invention to teach a peak strain detection linear displacement sensor system for smart structures, for use in the measurement of the linear displacement or strain of a structure using a micro miniature, high resolution, passive peak strain detector for determining damage or movement in the structure being monitored such as buildings, bridges, aircraft frames, landing gear, composite structures or the like, comprising a peak strain detection unit for measuring the deflection found in at least one structure being measured; said peak strain detector unit having means for positioning said peak strain detection unit and holding said peak strain detection unit in said position; said positioning and holding means comprises first means for clamping said peak strain detection unit, and second means for compressing or extending said peak strain detection unit; said positioning and holding means having attaching means for locating said peak strain linear displacement sensor system for smart structures on the structure or structures to be measured; means for restricting said peak strain detection unit to hold peak deflection of said peak strain detection unit; and means for measuring the levels of strain on said peak strain detection linear displacement system.

Also, it is the object of this invention to teach a peak strain detection linear displacement sensor system for smart structures, for use in the measurement of linear displacement or strain of a structure using a micro miniature, high resolution, passive peak strain detector for determining damage or movement in the structure being monitored such as buildings, bridges, aircraft frames, landing gear, composite structures or the like, comprising in combination a peak strain detection unit for measuring the deflection found in at least one structure being measured, the peak strain detection unit having a slideable core, positioning means for placing said peak strain detection unit in a predetermined position, means for attaching said peak strain detection unit to said structure being measured, restriction means for permitting of said slideable core at the point of maximum deflection, and measurement means for determining the level of deflection on the peak strain detection unit.

BRIEF DESCRIPTION OF THE INVENTION

Further objects and features of this invention will become more apparent by reference to the following description taken in conjunction with the following figures, in which.

DETAILED DESCRIPTION OF THE PREFERRED EMBODIMENTS

Figure 1:
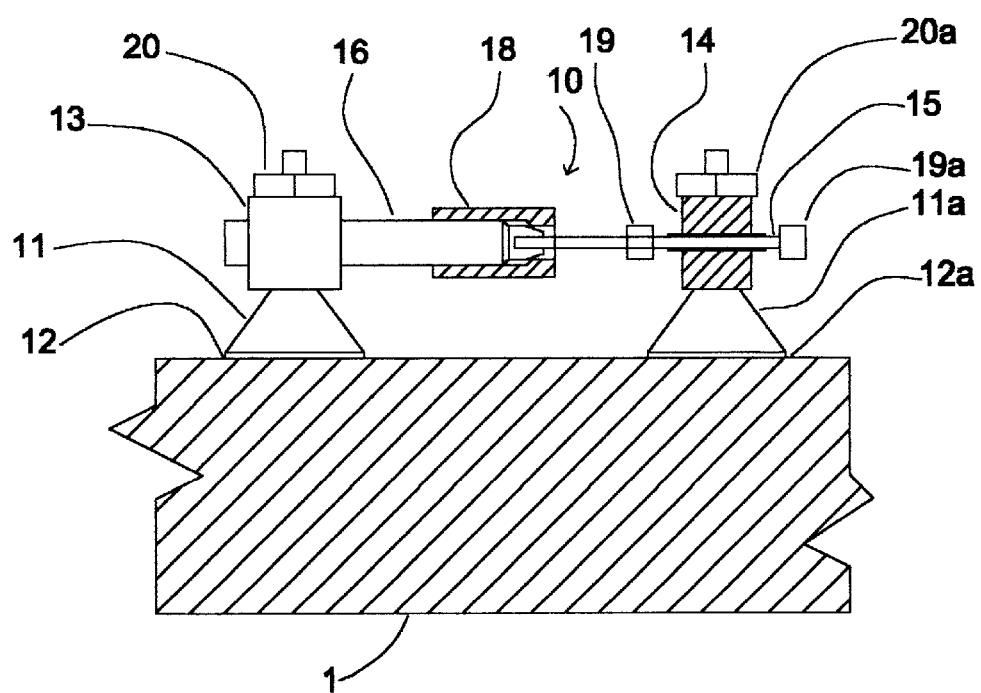
FIG. 1 is a cross sectional view of the novel peak strain detection linear displacement sensor system for smart structures.
Figure 2:
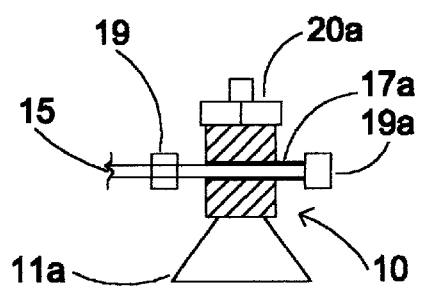
FIG. 2 is a side cross sectional view showing the core aligner in the position to prohibit the core from being pushed back into the transducer.
Figure 3:
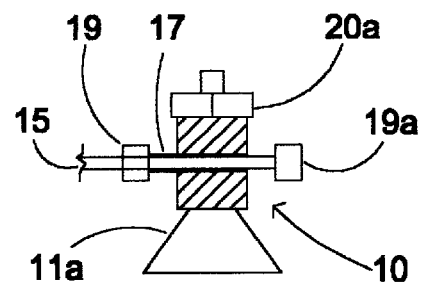
FIG. 3 is a side cross sectional view of the core aligner in a position to allow the core to be pushed into the transducer but will prohibit it from being pulled out of it.

As shown in the figures, the novel peak strain detection linear displacement sensor system for smart structures 10 is uses a differential variable reluctance transducer as its sensing unit. The system is comprised of attachment flat head screws units 11 and 11a which use an adhesive layer 12 and 12a to be attached to the material or structure 1 to be tested. The screw attachment units 11 and 11a run through apertures in the body clamp 13 and the core extender and compressor unit 14 and are used to compress the body clamp 13 and core extender and compressor units 14 with nuts 20 and 20a. The core extender and compressor 14 will pull out the slideable superelastic core 15 out of the transducer 16, but cannot push it back into the transducer 16 when the core aligner 17 is in the position shown in FIG. 2. The core aligner 17 is a cylindrical tube that acts as a mechanical pusher or puller. If the core aligner is in the position shown in FIG. 3, the then the core extender and compressor unit 14 will push the core 15 into the transducer 16 but cannot pull it out of the transducer 16. A spring loaded entrapment collar 18 envelopes the transducer 16 and applies a circumferential load to the core 15 to constrain it from free sliding. Tensile or compressive strains in the structure under test are transferred to the body clamp 13 and the core extender and compressor 14. The core extender and compressor 14 holds the core aligner 17 in position. The core aligner 17 presses against one of the core bumper 19 or 19a affixed at predetermined distances on the core 15 and displaces the core 15 in or out of the transducer 16. The core 15 will stick at the peak strain level because of the entrapment collar 18 will hold it in a fixed position.

The invention is a modification of a linear displacement sensor in order to produce a miniature, high resolution, passive peak strain detector. Once attached by adhesive, clips or any other mechanical means, mechanical movement of the core will always occur in response to structural deformation without power, so the device is inherently passive. By constraining the differential variable reluctance transducer's sliding core such that it can only be pulled or pushed, tension or compression peak strain detectors can be produced. The high resolution and small diameter allow the overall size of the device to be much smaller than many existing sensors. The device having a 100 mm separation can resolve strains down to fifteen microstrain. Damage to steel structural elements can occur in the region of fifteen hundred microstrain so the device is well suited to these applications. The sensor is very linear and may be calibrated over its full operating range.

Figure 4:
FIG. 4 is a chart showing the calibration of the peak strain detector differential variable reluctance transistor.
Figure 5:
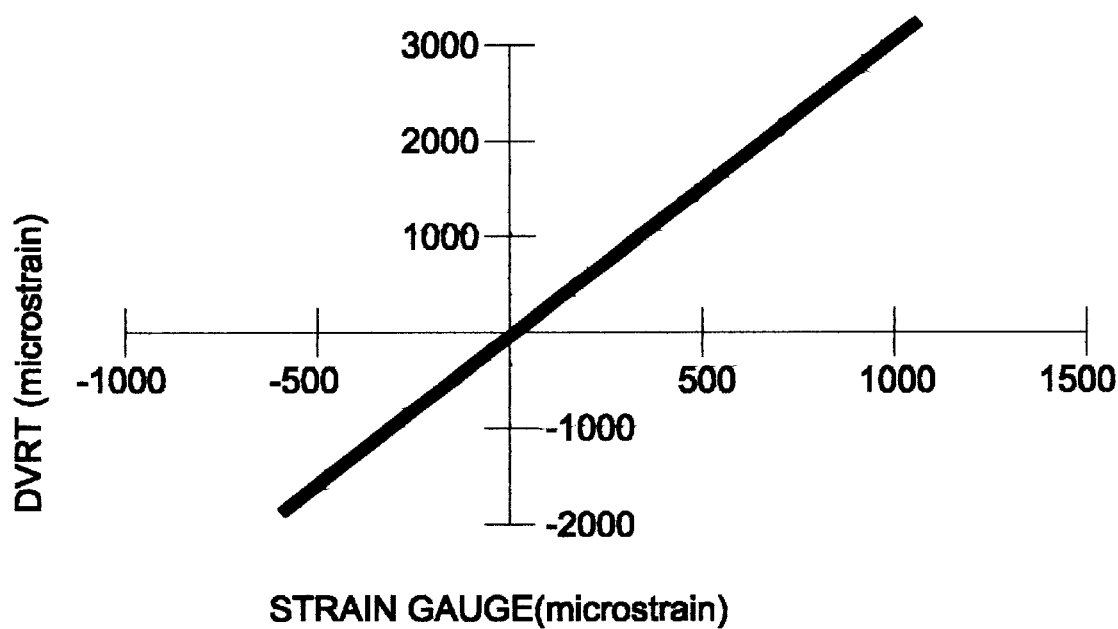
FIG. 5 is a chart showing the bonded resistance strain gauge output versus the differential variable resistance transducer.
Figure 6:
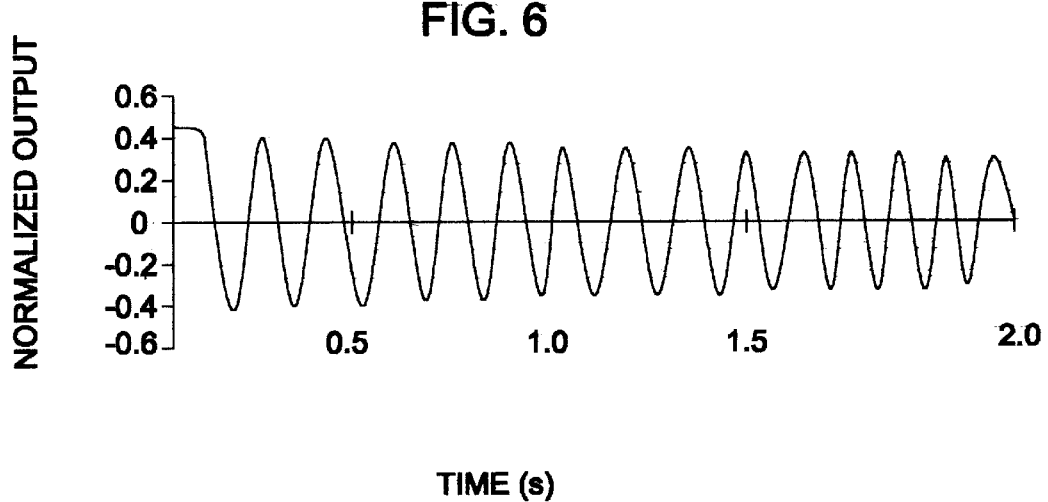
FIG. 6 is a chart showing the differential variable reluctance transistor, a bonded strain gauge output and peak strain detector output over time.

The effectiveness of the operation of the peak strain detection linear displacement sensor system for smart structures can be shown by reference to FIGS. 4, 5 and 6. The benchtop calibration of the system provided a sensitivity of −0.98 mm/volt and a nonlinearity of −0.42% to +0.39% of full scale over a 400 micron stroke range. Calibration used for continuous strain measurement provided a sensitivity of 0.107 mm/volt with a nonlinearity of −0.29% to 0.63% of full scale over a stroke range of 1 mm. Sensor displacements were approximately +40 microns for +1000 microstrain during testing. The differential variable reluctance transducer was found to track with bonded strain gauges extremely well. The correlation coefficients between the sensors ranged from 0.9989 to 0.9998 (N=6, mean=0.9996, standard deviation=0.0002). The peak strain detector measured the peak strain and held the strain for the entire test as shown in FIG. 6. The differential variable reluctance transducer tracked the bonded strain gauge as seen by their overlapping curves.

The system offers some inherent advantages over other methods of strain measurement. Differential variable reluctance transducers are housed in robust, moisture resistant packages and use superelastic cores which enable them to operate through a wide range of strain measurement. Strains can be measured through material yielding without damage to the sensor. Peak detection differential variable reluctance transducers may also be mechanically reset, which allows them to be used over and over again as opposed to TRIP type units.

While I have described my invention in connection with specific embodiments thereof, it is clearly to be understood that this is done only by way of example and not as a limitation to the scope of my invention as set forth in the objects thereof and in the appended claims.

I claim:

1. A measuring device for measuring peak-displacement comprising a first component, a second component separate from said first component, a sensor sensitive to relative position of said first component with respect to said second component, and a constraint, wherein said constraint holds said first and said second components at position of peak relative displacement of said first component with respect to said second component.

2. The device as recited in claim 1, wherein power is not required for holding said first and paid second components at position of peak relative displacement of said first component with respect to said second component.

3. The device as recited in claim 1, wherein said constraint comprises an entrapment collar.

4. The device as recited in claim 3, wherein said constraint comprises a spring loaded entrapment collar.

5. The device as recited in claim 3, wherein said entrapment collar envelops said core and applies circumferential load to said core to constrain said core from sliding after force is removed.

6. The device as recited in claim 1, wherein said constraint is connected to said second component for holding peak deflection of said first component with respect to said second component.

7. The device as recited in claim 1, wherein said sensor comprises an inductive sensor or a capacitive sensor.

8. The device as recited in claim 7, wherein said sensor comprises a variable reluctance transducer.

9. The device as recited in claim 1, wherein said device can be reset for further peak measurement.

10. The device as recited in claim 1, wherein output of said sensor is used to provide a measurement of displacement or strain.

11. The device as recited in claim 10, wherein said measurement is for determining movement of the structure or damage to the structure being monitored.

12. The device as recited in claim 10, wherein the structure being measured is a building, a bridge, an aircraft, a landing gear, or a composite structure.

13. The device as recited in claim 1, wherein said displacement is a vibration.

14. The device as recited in claim 13, wherein said displacement sensor tracks peak amplitude of said vibration and keeps said peak amplitude while said structure continues to vibrate.

15. The device as recited in claim 1, further comprising:
 a first attachment unit for connecting said first component to a structure at a first location,
 a second attachment unit for connecting said second component to the structure at a second location, said second location displaced from said first location.

16. The device as recited in claim 15, wherein said sensor provides a measurement of peak relative displacement between said first attachment unit and said second attachment unit.

17. The device as recited in claim 15, wherein said first component can move with respect to said first attachment unit.

18. The device as recited in claim 17, wherein said first component comprises a member that is slidable with respect to said first attachment unit and with respect to said second component.

19. The device as recited in claim 18, wherein said member comprises a core that is slidable into or out of said second component.

20. The device as recited in claim 19, wherein said core has a core position within said second component, wherein said second component comprises a sensor sensitive to said core position within said second component.

21. The device as recited in claim 19, wherein said core is superelastic.

22. The device as recited in claim 19, wherein said core comprises a bumper for providing movement of said core in response to movement of said first attachment unit.

23. The device as recited in claim 22, wherein said first attachment unit further comprises a tube for providing movement of said first attachment unit to said bumper.

24. The device as recited in claim 15, wherein said constraint allows said first component to be forded out of or into said second component.

25. The device as recited in claim 24, wherein said force is provided by either an increase in spacing or a decrease in spacing between said first and said second attachment units.

26. The device as recited in claim 15, wherein said second component is connected to said second attachment unit, wherein said second component cannot move with respect to said second attachment unit.

27. The device as recited in claim 15, wherein said relative displacement is provided by either an increase in spacing or a decrease in spacing between said first and said second attachment units.

28. The device as recited in claim 15, wherein said first attachment unit and said second attachment unit are connected to said structure with fasteners.

29. The device as recited in claim 28, wherein said fasteners comprise screws or adhesive.

30. A method of measuring a displacement comprising the steps of:
   a) attaching a first attachment unit to a structure at a first location;
   b) attaching a second attachment unit to the structure at a second location, said second location displaced from said first location;
   c) providing a passive peak-displacement sensor, said peak-displacement sensor comprising a first component and a second component separate from said first component, a sensor sensitive to relative position of said first component with respect to said second component, and a constraint, wherein said constraint holds said first and said second components at position of peak relative displacement of said first component with respect to said second component;
   d) providing a relative displacement of said first attachment unit with respect to said second attachment unit; and
   e) measuring peak displacement with said passive peak-displacement sensor.

* * * * *